TEMPORAL CHARACTERISTICS OF MULTIVIBRATORS

Filed Oct. 7, 1964

INVENTORS:
Wilhelm Sterff
Erich Huber
By Smyth, Roston & Pavitt
Attorneys 3,312,904
Patented Apr. 4, 1967

3,312,904

TEMPORAL CHARACTERISTICS OF MULTIVIBRATORS

Wilhelm Sterff and Erich Huber, Munich, Germany, assignors to Schaltbau-Gesellschaft m.b.H., Munich, Germany, a corporation of Germany Filed Oct. 7, 1964, Ser. No. 402,307
8 Claims. (Cl. 328—207)

The present invention relates to multivibrators. Multivibrators whether monostable or astable usually comprise electronic control elements such as electron tubes, transistors or the like in which the output circuit of at least one of these control elements is connected through a capacitor to the control electrode of the second control element. The capacitor is additionally connected to a discharge resistor.

The astable multivibrator may for example distinguish from the monostable multivibrator in that there is a similar connection made between the output circuit of the second control element and the control electrode of the first mentioned control element, no externally produced trigger signal is being applied to either electrode. On the other hand, a monovibrator is usually adapted to receive trigger signals for temporarily shifting the circuit into its astable state.

The oscillation period of either circuit is usually adjusted by making the capacitor or the discharge resistor a variable one. Such measure does not present difficulties if this adjustment serves for purposes of an initial calibration or initial adjustment to provide particular operating conditions, for example a particular frequency not to be changed later on. The same holds true for the timing of the astable period in a monovibrator. If, however, frequency and timing changes are desired in either one of these types of circuits, adjustment of the coupling capacitor and/or of the discharge resistor presents the following difficulty. During operation either one of these elements is passed through or is directly influenced by an electric current, since these circuit elements directly participate in the oscillator or vibrator operation for formation of electric current oscillations. Variable capacitors and variable resistors usually comprise construction elements which require relative physical movement for such an adjustment. Particularly, structural components have to be moved even though current is passing through them. This amounts to circuit breaker action. Therefore, an adjustment always is a detrimental influence, and might give rise to stray pulses or interruptions temporarily influencing the operation of the multivibrator in an unpredictable manner. A pulse or trigger signal might be missed, a phase shift might be introduced or a temporary drastic frequency change might give rise to a surge current in the output circuit as operated by the multivibrator.

It is an object of the present invention to provide a multivibrator circuit either of the monostable or the astable type which is free from the deficiencies outlined above and which for adjustment of the frequency does not require adjustable resistors and capacitors.

In either multivibrator circuit of the types outlined above, there is one control element which is temporarily nonconductive, i.e. the flow of current through such electron control element has been interrupted for an astable period of the multivibrator. This holds true for either control element in case of a completely astable multivibrator, but the invention basically is concerned with the adjustment of at least one astable period, regardless of whether or not the multivibrator circuit is adapted for the formation of another astable period.

The invention now suggests that an inductance be connected into the load circuit of that electronic control element which is being rendered conductive at the beginning of the astable period of the multivibrator. The inductance is to be connected in such a manner that the load current or at least a substantial portion of the load current of that one control element when conductive passes through the inductance. On the other hand, the inductance is to be connected in such a manner that it is connected in series with a capacitor coupling the output circuit of this one control element to the control electrode of the respective other control element, which is nonconductive during this astable period. The purpose thereof is that the magnetic energy stored in the inductance is added to the capactive energy discharged during this astable period so that the rate of capacitor discharge is diminished since the discharge of the inductance is added as charge to the capacitor during discharge thereof thereby increasing the discharge time of the capacitor. The total rate of discharge of this coupling capacitor determines the duration of the astable period and time of non-conduction of one of the elements. The inductance materially determines this astable period since the inductivity thereof is a measure of the amount of inductive magnetic energy that can be discharged through the capacitor for delaying the discharge of the latter. An inductance can be made variable without interruption of the electric current passed through the inductance. For example, variable inductances can be made by providing a coil with a core which is adjustable. For example, the core may have an adjustable air gap or one can change the position of the core relative to coil, or the like. In neither case is there any interruption of the current through the coil, and the adjustment does not involve movement of structural components of the coil.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

Figure 1:
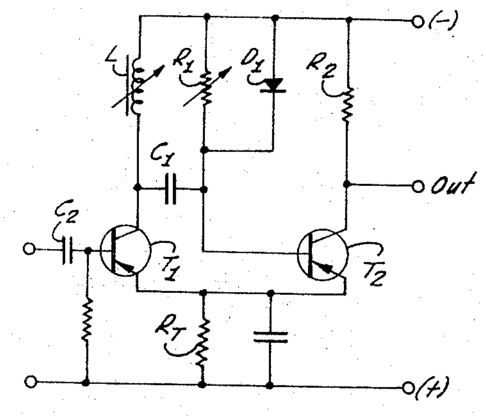
FIG. 1 illustrates schematically a circuit network for a monovibrator in accordance with the preferred embodiment of the invention.

Proceeding now to the detailed description of the drawing, in FIG. 1 thereof there is shown a monostable multivibrator or a single-shot circuit having as its primary active control elements two transistors T1 and T2, both of them being of the P-N-P type, and having their emitter electrodes respectively interconnected. A resistor RT connects this common emitter circuit to a source of positive voltage potential, and the resistor is shunted by a filter capacitor.

A capacitor C1 couples the collector electrode of transistor T1 to the base electrode of transistor T2. The collector circuit of transistor T1 is comprised of a variable inductance L having one terminal connected to the collector of transistor T1 and to one side of capacitor C1, in the following called the collector side. The other terminal of inductance L is connected to a source of negative voltage potential.

The collector circuit of transistor T2 is comprised of a resistor R2, and the collector electrode of transistor T2 itself serves as output electrode for this monostable circuit. The base electrode of transistor T1 is connected through capacitor C2 to a source of input trigger pulses.

A resistor R1 connects to the side of capacitor C1 which is connected to the base electrode of transistor T2. This will be called base-side of capacitor C1. The other side of resistor R1 is connected to the source of negative voltage potential. This resistor R1 serves as a discharge resistor for the capacitor C1. A diode D1 is connected across resistor R1 in such a manner that the cathode of the diode D1 connects to capacitor C1.

Normally the transistor T2 is conductive and transistor T1 is biased to cut-off. The biasing resistor connecting the base electrode of transistor T1 to the positive voltage source provides this cut-off control potential. The coupling capacitor C1 is charged in this normal or stable state in that its base side plate (connected to the base electrode of transistor T2) is positive relative to the collector side plate (connected to the collector electrode of transistor T1). A current flows through resistor R2, and the output terminal of the circuit furnishes a positive voltage potential.

If a negative trigger signal is applied to the input terminal and passed through a capacitor C2 in such a manner that the base electrode of transistor T1 is temporarily biased in a negative direction, then a collector current flows briefly through transistor T1 rapidly raising the potential at the collector side plate of capacitor C1. Since the voltage across the capacitor C1 does not follow this rapid change, the potential of the base electrode of transistor T2 is rendered more positively accordingly to temporarily block or cut off transistor T2. Transistor T2 remains cut off until the charge of capacitor C1 has changed to a new level in that a discharge current flows through resistor R1. The capacitor C1 has to discharge for this change.

The collector circuit of transistor T1 includes a choke or inductance L which is passed through by the collector current of transistor T1 and stores magnetic energy as soon as the collector current begins to flow. As soon as the input trigger signal applied to the capacitor C2 has decayed, the electromagnetic energy stored in the inductance L is discharged therefrom and fed as an electric charge current to the capacitor C1 to delay the discharge thereof, and the cut-off time of transistor T2 is extended beyond the time of decay of the trigger pulse applied to transistor T1. One can see that the duration of current conduction of transistor T2 defines the astable period of this monovibrator which period of time is determined by the inductance L.

The inductivity of the inductance can be changed without any change or modification in the wiring connections or in the structure of any of the current conductive elements. Usually, in order to adjust the timing of the astable period of such monostable circuits, adjustable resistors or capacitors are employed which are elements requiring structural and physical changes for adjustment. The adjustment of a capacitor or of a resistor is possible only by shifting parts relative to each other, even though a current flows in between them. Thus, such adjustment involves circuit breaking and making. Rotatable capacitors are limited in their use, and particularly for high frequency circuits of this nature they cannot be used, even though they are relatively free from the limitations set by the structure permitting variation of the capacity values.

The situation is different as far as inductances are concerned. An inductivity defined by a coil wound on a core can be changed, for example, by shifting the core relative to the coil, by changing the configuration of the core (gap control), by changing the magnetic flux path in the core, etc. and in neither case the electric current path through the coil will be influenced in any manner, there is no circuit breaking.

Normally, stable or monostable multivibrators are dimensioned that the recovery time after the astable period is shorter than the arrival of the next trigger pulse. The diode D1 serves to prevent the formation of an oscillator circuit by the inductance L and the capacitor C1. Since the diode D1 is poled in opposite direction as the direction of the discharge current of the capacitor, any oscillation in opposite direction to the discharge current is short-circuited through the diode D1 and suppressed accordingly. Additionally, it is being prevented that a portion of the energy stored in the inductivity L is lost as heat in discharge resistor R1.

The recovery time of any multivibrator is dependent upon the total overall collector resistance of the transistor T1 which in the present case, of course, includes the inductance L, the ohmic resistance of the coil providing the inductance L, and including further the capacitance of the capacitor C1. During the recovery time the capacitor plate connected to the collector electrode of transistor T1 is to be charged to regain the original negative potential, which actually is the potential of the negative voltage source. The deviation of this recharging of the capacitor can also be varied by varying the inductance L.

If the multivibrator is triggered periodically with pulses following each other at such a rate that the capacitor C1 is in effect not completely recharged, then the time for capacitor discharge during the astable period is reduced, and the output pulses derived from the output terminal are accordingly shorter. Also in this case one does not need the diode D1, since no oscillation can form.

Assuming that the maximum voltage across the coupling capacitor C1 is U, assuming further that the voltage difference between the sources of positive and negative voltage potentials is U1, and assuming further that the electromagnetic energy stored in the inductance L is W, then there is the following relation $$U=\sqrt{U1^2+W/C1}$$

This relation is true only if the discharge resistor R1 is dimensioned so that an aperiodic oscillation condition is present. The degree of attenuation of any periodic oscillation can be improved considerably by the diode D1 as was outlined above. Accordingly, the base potential of the transistor T2 can, therefore, be raised up to a value that equals $$\sqrt{U1^2+2W/C1}$$

The astable period of the monovibrator depends upon the discharge of capacitor C1 via the resistor R1 and it depends upon the charging voltage. One can see from the above given formula that the astable period of the monovibrator is directly dependent upon the stored energy W which in turn of course depends on the inductance L, since the energy W prolongs the discharge time of capacitor C1 by adding a charge thereto during the discharge period.

Figure 2:
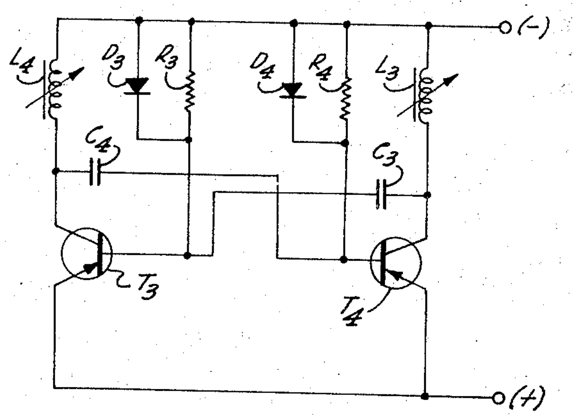
FIG. 2 illustrates schematically a circuit network for an astable multivibrator in accordance with the preferred embodiment of the invention.

Proceeding now to the description of FIG. 2 there is shown an astable multivibrator having as its active circuit elements two transistors T3 and T4 having their emitter electrodes directly connected to the source of positive voltage potential. The collector electrode of transistor T3 connects through a coupling capacitor C4 to the base electrode of transistor T4 and through an inductance L4 to the source of negative voltage potential. Similarly, the collector electrode of transistor T4 connects through a capacitor C3 to the base electrode of transistor T3 and through an inductance L3 to the source of negative voltage potential.

Resistors R3 and R4 respectively connect the base electrodes of the transistors T3 and T4 to the source of negative potential, and diodes D3 and D4 respectively shunt the resistors R3 and R4 in such a direction that the cathode of a diode connects to the respective base electrode of a transistor.

As one can see the collector circuit of either transistor includes an inductance. It should be mentioned, however, that for practicing the invention, it is not mandatory to have inductances in the collector circuits of both transistors. This depends on the degree of adjustment desired. It may be sufficient, if one of the collector circuits includes an adjustable inductance while the other collector circuit includes an adjustable inductance while the other collector circuit is comprised of an ohmic resistor. The utilization of adjustable inductances in the collector circuits of either transistor provides a means for adjustment of the duration of both phases of the oscillations produced by the multivibrator. An adjustable inductance in but one phase, and the other phase then remains fixed.

The discharge resistors R3 and R4 can be made adjustable in order to match the circuits for the two transistors to each other, since there are certain differences in the characteristics of either of them which can be adjusted by adjusting either one or both of the resistors R5 and R6.

It is important to note that this does not negate the advantages of the invention, since resistors R3 and R4 will be adjusted prior to any operation for purposes of calibration and during testing prior to field operation. Once they have been adjusted, their values remain set not excluding the possibility of recalibrating the device from time to time. This has nothing to do with the adjustment of the inductances during operation.

Figure 3:
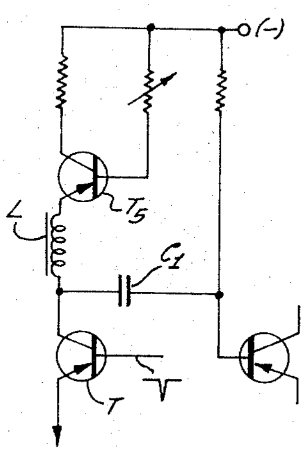
FIGS. 3 and 4 illustrate modifications for either circuit network shown in FIGS. 1 and 2.

In FIG. 3 there is shown how either one of the circuits of FIG. 1 and FIG. 2 can be modified by connecting another transistor T5 in series to the inductance such as L (or L3 or L4) so that the emitter collector path of the transistor T5 constitutes a portion of the load circuit, i.e. the collector circuit of a transistor T (T1, or T3 or T4). The base current, i.e. the base bias of the transistor T5 is then being controlled by an additional resistor which may be a variable one, without departure of the scope of the invention, since the base circuit of transistor T5 itself is not participating in the production of oscillator currents of the multivibrator itself.

Figure 4:
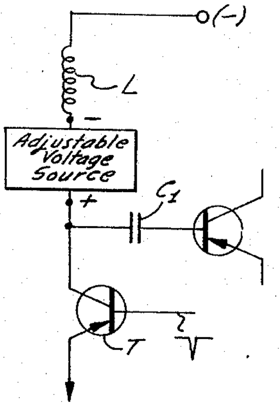

As shown in FIG. 4, the discharge current of the inductance L can be supplemented by a current from a low impedance battery B to prolong the discharge period of the capacitor C1 during an astable period.

The invention finds utility for the control of equipment requiring frequent control operations and in which normally control elements requiring circuit breaker action will wear very rapidly. Such is the case, for example, for the control of electric motors driving vehicles, cranes, conveyors or the like. Adaptation of the circuit networks illustrated for the utilization of electron tubes is readily susceptible from the foregoing description, and the invention is not limited to the specific embodiments described above, but all changes and modifications thereof not constituting departures from the spirit and scope of the invention are intended to be covered by the following claims:

What is claimed is:

1. In a multivibrator circuit having first and second electronic control elements, each having first and second main electrodes and a control electrode and wherein said first main electrodes of said control elements are interconnected for connection to a first source of voltage potential, and wherein the second main electrode of said first control element is connected to the control electrode of said second control element by means of a capacitor, the improvement comprising:

inductive means connected in series to said second main electrode of said first control element and for connection to a second source of voltage potential, so that the load current of said first control element when conductive is passed through said inductive means;

a discharge resistor connected to said capacitor at the side thereof connected to said control electrode; and a diode connected across said discharge resistor at such a polarity opposite to the direction of the discharge current through said discharge resistor as existent during the time of current conduction through said first control element.

2. In a multivibrator circuit having first and second electronic control elements, each having first and second main electrodes and a control electrode, and wherein said first main electrodes of said control elements are interconnected for connection to a first source of voltage potential, and wherein further the second main electrode of said first control element is connected to the control electrode of said second control element by means of a capacitor, the improvement comprising:

inductive means connected in series to the said second main electrode of said first control element for connection to a second source of voltage potential, so that the load current of said first control element when conductive is passed through said inductive means storing energy therein, said inductive means, said capacitor and said second main electrode of said first control element having a common junction so that the discharge of energy stored in the inductive means flows through the common junction as charging current for the capacitor; means for applying a variable signal as trigger signal to the control electrode of the first control element for the control of current conduction through the first control element;

a discharge resistor connected to the capacitor at the side thereof connected to said control electrode; and means operatively coupled to the inductive means for adjusting the discharge of energy from the inductive means independently from the resistance of said discharge resistor;

3. A multivibrator, comprising:

a first and a second electronic control element each having first and second main electrodes and a control electrode and each permitting unidirectional current conduction between its main electrodes;

first and second terminals for connection to a D.C. voltage source;

means for connecting the first main electrodes of said first and second control elements to said first terminal;

capacitor means interconnecting the second main electrode of said first control element and the control electrode of said second control element;

inductance means connecting said second main electrode of said first control element to said second terminal so that the current through the inductance means flows substantially into the capacitor when the first control element is substantially currentless;

resistive means connecting said capacitor means where connected to said control element electrode, to said second terminal;

a diode connected across said resistive means and having a polarity opposite to the direction of the discharge current flowing from the capacitor means through the resistive means;

circuit means for connecting said second main electrode of said second control element to said second terminal; and circuit means for applying a variable control signal to the control electrode of said first control element.

4. A multivibrator, comprising:

a first and a second electronic control element each having first and second main electrodes and a control electrode and each permitting unidirectional current conduction between its main electrodes;

first and second terminals for connection to a D.C. voltage source;

means for connecting the first main electrodes of said first and second control elements to said first terminal;

capacitor means interconnecting the second main electrode of said first control element and the control electrode of said second control element;

resistive means connecting said capacitor means where connected to said control element electrode, to said second terminal;

inductance means connecting said second main electrode of said first control element to said second terminal so that the load current through the first control element flows through the inductance means storing electrical energy therein, the inductance means being connected to said capacitor so that electrical energy stored in the inductance means flows as charging current into the capacitor thereby delaying discharge of the capacitor through the resistive means;

controllable impedance means connected in series to said inductance means for adjusting the current through said inductance means including said charging current independently from the current control of said first control element;

circuit means for connecting said second main electrode of said second control element to said second terminal; and circuit means for applying a control signal to the control electrode of said first control element.

5. A multivibrator, comprising:

a first and a second electronic control element each having first and second main electrodes and a control electrode and each permitting unidirectional current conduction between its main electrodes;

first and second terminals for connection to a D.C. voltage source;

means for connecting the first main electrodes of said first and second control elements to said first terminal;

capacitor means interconnecting the second main electrode of said first control element and the control electrode of said second control element;

inductance means connecting said second main electrode of said first control element to said second terminal, to be charged with energy when said first control element is rendered conductive and to discharge such energy into said capacitor to delay discharge of said capacitor, when said second control element is non-conductive;

an auxiliary voltage source connected to said inductance means to provide additional electrical energy to said capacitor during discharge thereof;

resistive means connecting said capacitor means where connected to said control element electrode, to said second terminal;

circuit means for connecting said second main electrode of said second control element to said second terminal; and circuit means for applying a control signal to the control electrode of said first control element.

6. A multivibrator comprising a first and a second electronic control element each having first and second main electrodes and a control electrode and each permitting unidirectional current conduction between its main electrodes;

means for connecting said first main electrodes to a first terminal to receive therefrom a first voltage potential;

first and second capacitor means respectively connecting said control electrodes of said first and second control elements to said second main electrodes of said second and first control elements;

first and second inductance means respectively connected to said second main electrodes and to a second terminal to receive therefrom a second voltage potential;

first and second resistive means respectively connecting said first and second capacitor means to said second terminal, said second main electrodes being separated from said first and second resistive means respectively by said first and second capacitor means; and diodes respectively connected across said first and second resistive means and at a direction opposite to the direction of capacitor discharge current when respectively flowing through said resistive means.

7. A multivibrator comprising:

a first and a second electronic control element each having first and second main electrodes and a control electrode, and each permitting unidirectional current conduction between its main electrodes;

means for biasing said first main electrodes of said first and second control elements to a common potential as derivable from a first source of voltage potential;

first and second capacitor means respectively connecting said control electrodes of said first and second control elements to said second main electrodes of said second and first control elements;

load circuits for each of said control elements respectively connected to said second main electrodes and for connection to a second source of voltage potential and including at least one inductance connected in series with one of said main electrodes;

first and second resistive means respectively connecting said first and second capacitor means to receive said second source of voltage potential, said second main electrode being separated from said first and second resistive means respectively by said first and second capacitor means; and first and second diodes respectively connected across said first and second resistive means at a polarity opposite to the respective discharge currents from the first and second capacitors through the respective first and second resistive means.

8. In a multivibrator circuit having first and second electronic control elements, each having first and second main electrodes and a control electrode and wherein the first main electrodes of said control elements are interconnected and are respectively connected to a first source of voltage potential, and wherein the second main electrode of said first control element is connected to the control electrode of said second control element by means of a capacitor, the improvement comprising:

variable inductive means connected in series to said second main electrode of said first control element and to a second source of voltage potential, so that the load current of said first control element when conductive is passed through said inductive means for storing energy therein;

an adjustable discharge resistor connected to said capacitor at the side thereof connecting to said control electrode; said capacitor and said inductive means defining a circuit path wherein the inductive means discharges stored energy into the capacitor when the capacitor discharges through the discharge resistor to effectively reduce the discharge rate of the capacitor; a diode connected across said discharge resistor and at a polarity opposite to the direction of the discharged current flowing from said capacitor through said discharged resistor; and means for applying variable signal as trigger signal to the control electrode of the first control element for the control of current conductions through the first control element.

References Cited by the Examiner

UNITED STATES PATENTS

| | | | |
|---|---|---|---|
| 3,161,785 | 12/1964 | Cann | 331—113 |
| 3,170,072 | 2/1965 | Hellstrom | 307—88.5 |

FOREIGN PATENTS

| | | |
|---|---|---|
| 1,064,567 | 9/1959 | Germany. |
| 1,095,878 | 12/1960 | Germany. |

ARTHUR GAUSS, *Primary Examiner.*

R. H. EPSTEIN, *Assistant Examiner.*